April 6, 1954     J. L. DEFFENBAUGH     2,674,504
JOURNAL SHAFT

Filed March 25, 1950     2 Sheets-Sheet 1

INVENTOR.
John L. Deffenbaugh
BY Charles M. Fryer
ATTORNEY.

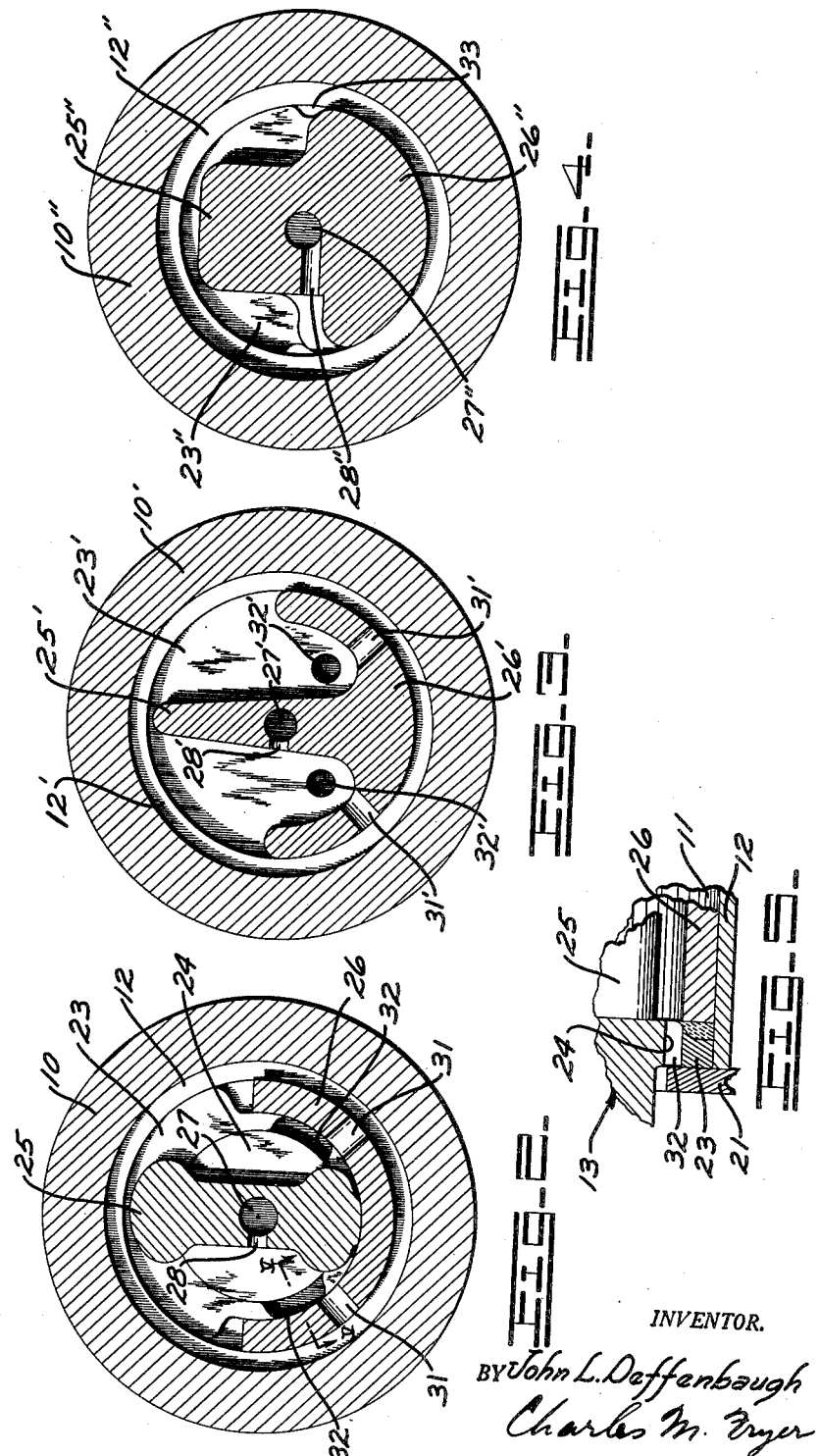

Patented Apr. 6, 1954

2,674,504

UNITED STATES PATENT OFFICE 2,674,504

JOURNAL SHAFT

John L. Deffenbaugh, Peoria, Ill., assignor to Caterpillar Tractor Co., Peoria, Ill., a corporation of California Application March 25, 1950, Serial No. 151,872

2 Claims. (Cl. 308—92)

This invention relates to journal shafts and particularly to lubrication thereof.

The present invention will have many applications but is especially useful for and will be disclosed herein as applied to a journal shaft for a track roller of the type commonly employed in a track type tractor for supporting the main body of the tractor on the endless track mechanism.

In a track type tractor, the track rollers and their supporting shafts are subjected to extremely heavy duty in an environment of a particularly abrasive nature and are subjected to severe loads of high magnitude. As a result, it is imperative that the supporting shafts be strong and rigid and that the bearings in the rollers receive adequate lubrication at all times. Due to the relatively small size of such rollers and the necessity of providing high load carrying ability, very little space is available to serve as a reservoir for bearing lubricant and, as a result, frequent lubrication periods are required. Efforts have been made in the past to overcome this shortcoming by providing a shaft having a hollow journal portion, however, such shafts are invariably weakened and, in addition, have a serious shortcoming in that it is very difficult to flush contaminated lubricant from the reservoir.

It is, therefore, an object of this invention to provide a journal shaft for a track roller or the like which includes space for a large quantity of lubricant without materially reducing its capacity to sustain the loads to which it is subjected in use and without substantially reducing its useful bearing surfaces.

Another object of this invention is to provide a journal shaft for a track roller or the like having voids provided therein to provide reservoirs for bearing lubricant and a semi-cylindrical bearing surface for contact with the supporting bearings in the load sustaining area to increase the volume of the lubricant reservoirs.

Other objects and advantages will be made apparent in the following specification wherein reference is made to the accompanying drawings.

In the drawings:

Fig. 2 is a transverse sectional view taken along the line II—II of Fig. 1;

Fig. 3 is a view like Fig. 2 showing a modified form of the invention;

Fig. 4 is a similar view of another modification of the invention; and

Fig. 5 is a fragmentary sectional view taken along the line V—V of Fig. 2.

Figure 1:
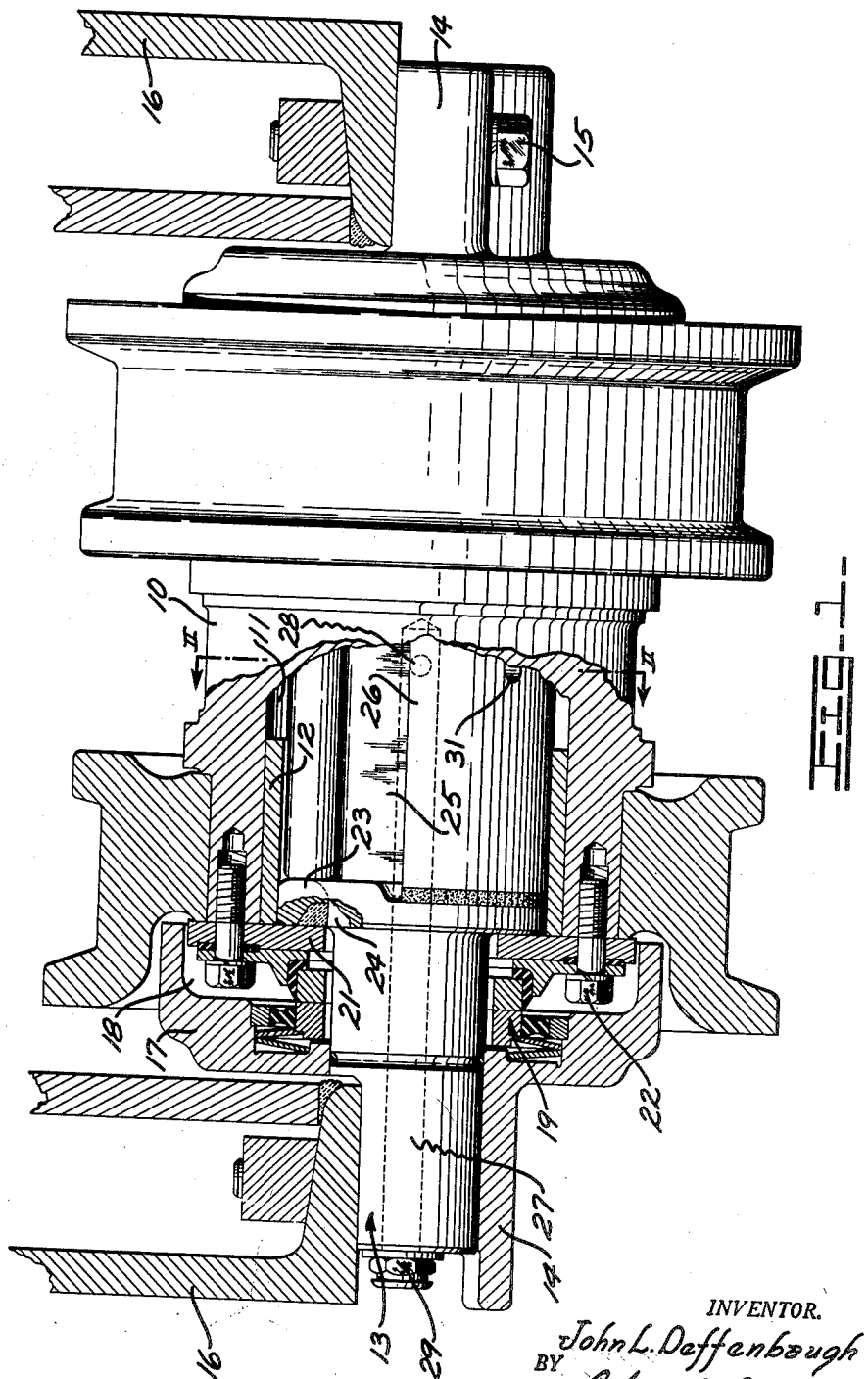
Fig. 1 is a view in side elevation of a track roller and its supporting journal shaft with portions broken away to more clearly illustrate the invention.

In Fig. 1, a typical track roller of the type commonly employed for supporting a track type tractor is illustrated at 10 as having an axial bore 11 for the reception of spaced bearings only one of which is illustrated at 12. The track roller is carried for rotation on a shaft 13, embodying the present invention, the ends of which are secured as by clamps 14 and bolts 15 to a pair of spaced structural members 16 forming a part of the roller truck frame supporting the tractor (not shown). Each of the clamps 14 carries an outwardly extending flange 17 having a cup-like recess 18 for the reception of a dirt and grease seal generally indicated at 19. The seal is interposed between the flange and a thrust washer 21 secured as by cap-screws 22 to the track roller 10. The thrust washer is adapted to engage an annular collar 23, secured as by welding to a slightly enlarged circular portion 24 of shaft 13, to prevent endwise movement of the track roller.

In a track roller of this type, as well as in many rotating parts, the principal loads are always in the same direction thus the journal portion of the shaft between the collars 23, indicated at 25, is made large or substantially the size of the diameter of the bearings 12 in the load sustaining direction. However the sides of the journal portion 25 opposite from the direction of loading are eliminated leaving a substantially I-shaped section which is best illustrated in Fig. 2. A bearing surface for load carrying contact with the bearings 12 is provided by a semi-cylindrical member 26 the ends of which are secured as by welding to the collars 23. By eliminating the sides of the journal portion 25 of the shaft and that portion of the journal bearing surface not required for load carrying contact with the bearings, a reservoir is formed for the reception of lubricant which may be admitted thereto by way of drilled passages 27 and 28 provided in the shaft. At its outer end the passage 27 is provided with a suitable fitting 29 for admitting lubricant. Lubricant from the reservoir is admitted to the bearings 12 through passages 31 provided in the semi-cylindrical member 26 and to the thrust faces between the collars 23 and thrust washers 21 by way of passages 32 provided in the collars 23, see Figs. 2 and 5.

The shaft described above may be easily fabricated forming a shaft of adequate strength and rigidity in its load sustaining direction as well as space for the storage of a large volume of lubricant thus making it possible to operate for extended periods of time without the necessity of frequent stops for lubrication. As the lubricant reservoir is formed between the exterior of the shaft and the load supporting bearings it is readily accessible for cleaning when the shaft is withdrawn from the bearing making it possible to remove any contaminated lubricant which otherwise would result in decreased life of the bearings.

Fig. 3 illustrates a modified form of the invention in which like parts are identified with the same reference characters primed. In this modification the load sustaining portion of the shaft 25', semi-cylindrical bearing part 26', and thrust collars 23' are forged as integral parts with the shaft. As a result, the section of the load sustaining portion 25' of the shaft is tapered to accommodate the forging dies during manufacture.

Fig. 4 illustrates another modification in which like parts are identified with the same reference characters double primed. In this modification, the track roller shaft is again formed as a single forging. In this case, greater mass has been retained in the entire structure to sustain even greater stresses than the designs of the previous modification. Furthermore, introduction of lubricant to the cylindrical bearing area is facilitated by rounding its edges, as shown, and recesses 33 in the thrust collar serve as the openings 32' in Fig. 3 to admit lubricant to the thrust bearing surfaces.

I claim:

1. In a normally horizontally disposed shaft having a journal portion, a rotatable bearing supported thereby, said journal portion being characterized by a cross-sectional contour including a bearing part of generally semi-cylindrical shape for contact with the bearing only on the principal load sustaining side of the journal and a load sustaining part of relatively narrow width joined to the bearing part and extending substantially the distance of the bearing diameter in its load sustaining direction whereby approximately half of the space within the bearing remains available for the reception of lubricant.

2. In the combination which includes a journal and a bearing thereon wherein the principal load on the journal is imposed from one side, a journal construction characterized by a cross-sectional contour including an arcuate portion disposed on the load sustaining side for contact with the bearing and a relatively flat portion joining the arcuate portion centrally thereof and extending through the center of the bearing toward the opposite side thereof, said portions being dimensioned to leave approximately half the space within the bearing for reception of lubricant.

References Cited in the file of this patent

UNITED STATES PATENTS

| Number | Name | Date |
|---|---|---|
| 95,716 | Nash | Oct. 12, 1869 |
| 400,784 | Mulhaupt | Apr. 2, 1889 |
| 1,799,935 | Taylor | Apr. 7, 1931 |
| 2,054,532 | Baker | Sept. 15, 1936 |